United States Patent [19]

Fader

[11] Patent Number: 5,037,628
[45] Date of Patent: Aug. 6, 1991

[54] METHOD FOR RECLAIMING CARBONACEOUS MATERIAL FROM A WASTE MATERIAL

[75] Inventor: John H. Fader, Ann Arbor, Mich.

[73] Assignee: American Tire Reclamation, Inc., Ann Arbor, Mich.

[21] Appl. No.: 613,462

[22] Filed: Nov. 7, 1990

Related U.S. Application Data

[63] Continuation of Ser. No. 461,162, Jan. 5, 1990, abandoned, which is a continuation of Ser. No. 85,880, Aug. 14, 1987, abandoned.

[51] Int. Cl.$^5$ .................. C01B 31/02; C09C 1/48
[52] U.S. Cl. .................. 423/449; 423/445; 423/461; 23/314
[58] Field of Search .............. 423/445, 449, 450, 461; 23/314; 106/307

[56] References Cited

U.S. PATENT DOCUMENTS

| T. 965,002 | 12/1977 | Crane et al. | 423/445 |
|---|---|---|---|
| 2,719,135 | 9/1955 | Wood | 423/461 |
| 3,823,224 | 7/1974 | Laman et al. | 423/461 |
| 3,966,487 | 6/1976 | Crane et al. | 423/449 |
| 3,978,199 | 8/1976 | Maruhnic et al. | 423/461 |
| 3,996,022 | 12/1976 | Larsen | 423/449 |
| 4,002,581 | 1/1977 | Watanabe et al. | 423/449 |
| 4,038,100 | 7/1977 | Haberman | 423/449 |
| 4,221,608 | 9/1980 | Beckman | 423/449 |
| 4,250,158 | 2/1981 | Solbakken et al. | 423/449 |
| 4,284,616 | 8/1981 | Solbakken et al. | 423/461 |

Primary Examiner—Robert Kunemund
Attorney, Agent, or Firm—Harness, Dickey & Pierce

[57] ABSTRACT

A method for reclaiming carbon black from scrap rubber material including the following steps. The scrap rubber material is first pyrolyzed to produce a char material that contains a mixture of agglomerated or cluster particles which consist of agglomerations of finer carbon black particles and unitary grit like particles. The agglomerated particles are then selectively de-agglomerated by agitation of the char material into the finite component particles of carbon black. These finite component particles are then separated from the unitary particles to obtain a final carbon black which is comparable to commerical grade carbon blacks.

19 Claims, 3 Drawing Sheets

_Fig-1_

_Fig-2_

METHOD FOR RECLAIMING CARBONACEOUS MATERIAL FROM A WASTE MATERIAL

This is a continuation of U.S. patent application Ser. No. 7/461,162, filed Jan. 5, 1990 (now abandoned) which is a continuation of U.S. Ser. No. 7/085,880 filed Aug. 14, 1987 (now abandoned).

TECHNICAL FIELD

The present invention relates to methods for reclaiming useful materials from discarded waste materials. More particularly, the present invention relates to reclaiming of carbon black from scrap or discarded rubber materials.

BACKGROUND

In recent years with the increase in oil prices and the increasing awareness of growing waste problems, there has been an increasing interest in the reclamation of usable waste materials from waste products. In recent years the process of pyrolysis has been used in reclaiming various materials from waste by providing a rapid decomposition and recovery of organic matter contained in the waste. Using this process on carbonaceous material such as plastic, wood, paper, cardboard, scrap rubber, coal, coke, coal tars, oils, live stock manure, and other garbage and solid waste will allow the reclamation of usable organic materials.

A major waste problem in the world today is the disposal of automobile and other vehicle tires. It is estimated that nationally two hundred million automobile tires and forty million truck tires are discarded annually in the United States alone. It is estimated that less than twenty percent of the tires removed from vehicles today are recovered for recapping for resale and only ten percent are reclaimed for other uses. The remaining seventy percent of the waste tires are a disposal problem.

In the past, tires have been burned or dumped in land fills in order to dispose of them. The burning of tires has long been disfavored due to the substantial amounts of noxious gases given off while burning. Tires are also undesirable for disposal in landfills since they do not readily deteriorate. In addition, scrap tires in landfills form an unhealthy breeding ground for insects, rats and other vermin.

In recent years there has been some success in recycling of tires and reclaiming usable hydrocarbons from scrap tires by use of pyrolysis. By the process of pyrolysis some tires have been advantageously processed to recover fuel and other hydrocarbon compounds. This fuel may be extracted in the form of highly aromatic oils and/or a gas which has heating values ranging from eighty to two thousand BTU per cubic foot. A by-product to this pyrolysis process is an ash or char material that remains after completion of the process. In the past this ash or char material was generally considered not worth salvaging unless it could be somehow reused as a filler or a low grade carbon black by industry, or if used as a fuel supplement to coal.

The industry has attempted to use this char as a low grade carbon black. This use has been found generally disadvantageous since the consistency of the char has been known to contain a random distribution of particle size from extremely small particles to extremely large particles. These particles range in size from less than one micron to over one thousand microns in size. This particulate matter, in its rough char form, is mixed with fiber and steel impurities from the tire or rubber feedstock which must be removed for use in industry and also consists of gritty sand like particles which are undesirable for use as a filler.

Such reclaimed char material has not generally been accepted in the industry due to the existence of these impurities and because of actual problems encountered in the industry by the use of such by-products as fillers or coloring agents in manufactured products. Although attempts have been made to filter out steel, fiber and ash, that remain in the char, by mechanical separation processes, these processes have generally not been sufficient to obtain a suitable product. Additionally, it has not been possible to filter out or separate the larger grittier particles from the desired carbon black particles by the present methods.

Therefore, the pyrolysis processes of the past have not generally been accepted in the industry as producing a sufficient grade carbon black, since the smallest particle size which has been obtained has been approximately an eighteen mesh (1,000 microns) char or carbon black product. The use of this unrefined product in materials as a carbon black has also found disrepute because products produced from these types of particles have been found to be less structurally stable than those same products produced with commercially produced carbon blacks. Therefore, it has been extremely difficult for those producing this char to find markets for the char by-product as a coloring additive, or carbon black filler.

Attempts have been made in the past to reduce the char particle size such that a more commercially acceptable grade of carbon black could be obtained. A fluid energy mill process has been used to pulverize the char particles to produce a finer particle size by way of implosion of all particles in the char material. Such a process is shown in U.S. Pat. No. 3,644,131 issued to Gotshall. These processes will produce in the one to ten micron range of char particles. However, the capital, expenditure and operating expenses for set up and operation, and the high amounts of energy cost required for use of such a process in production make the resulting product too expensive for normal scaled production. This process requires the grinding of all of the char material whether it is a desired carbon black or the undesired gritty type particle since it relies on reduction of all of the particle sizes no matter what the form is of the material contained in the char. This results in the grinding of some of the unwanted gritty material along with reduction in size of the carbon black material. Therefore this process has not been commercially exploitable at the present prices of carbon black due to the production costs involved and the impurities contained in the final product. The only potentially commercial application in which such a process could be exploited is in large scale facilities, such as a facility which could process approximately one hundred tons of tires per day. Thus, while tests run on the products using the material produced by this process seemed to have improved rubber reinforcing characteristics over the former unrefined char product, the cost and energy effectiveness of the process is extremely prohibitive.

In other attempts for refining the char material, a roller grinding mill similar to the type used to grind coal particles into fine particles for combustion etc. have been used in reducing the char particles. However, with this method the particle size is limited to about a 325 mesh or 45 micron bulk product. These 325 mesh char ground products have been used in formulations and did show improved rubber reinforcing properties, however, this process again has not been found to be commercially practical due to the excessive costs and high amounts of energy consumed by such a process to produce the desirable product. Again the process used is a size reduction process wherein all of the char material particle size is reduced. This causes some unwanted materials to be contained in the final product.

Therefore it has been a goal in the art to produce such a fine grade of carbon black without the expensive cost of production which were necessary in the prior art methods. There have been several attempts to produce a carbon black material which is suitable for industrial use and may be used exactly as its commercial counter parts but at a lesser cost which would make such a product truly feasible to produce, but up to the present time these attempts have been generally unsuccessful.

It has been known by persons using the unprocessed char that elastomeric/rubber formulas that use the unrefined char compound have substantially different properties than were expected. These compounds using the char were found to be less structurally stable than those using conventional carbon black. While these results were noted by others in the art, the reason for such a phenomenon was not pursued. The present inventor then took it upon himself to find out the cause of this problem when a char material was used in an elastomer/rubber formulation. Through extensive research and analysis of the chemistry, structure, and physical properties of the compounded rubber and the char particles from various char samples, it was discovered that large portions of the char materials that remain from the pyrolysis of carbonaceous material are actually agglomerations or clusters of small and even submicron carbon black and filler particles. It was also found that the char material also contained hard gritty unitary particles which are undesirable in a usable carbon black material. It was found that the agglomerations or cluster particles contain the sought after carbon black particles and that the hard gritty unitary particulate material is undesirable in a carbon black material.

Thus, the present inventor discovered that these char particles which were previously thought of and accepted as hard gritty unitary particles, which made it necessary to expend large amounts of energy to grind or mill the unitary particles to a smaller size, where actually a mixture of the hard gritty unitary particles and the agglomerate or cluster particles of many small carbon black and filler particles originally used in the material when it was compounded. The inventor has discovered that it is necessary to expend only enough energy to de-agglomerate the agglomerate or cluster particles to produce a quality carbon black material and leave the unitary particles intact.

Therefore, in using this discovery in a commercial application the inventor has discovered a new useful process for reclaiming a usable carbon black particulate material from discarded rubber by selective de-agglomeration of these cluster or agglomerate particles and the separation of the carbon black from the remaining gritty unitary particles. This process is commercially practical and requires less energy to be expended, thus resulting in a commercially practical use of this char material.

SUMMARY OF THE INVENTION

According to the present invention there is provided a method for reclaiming carbonaceous materials from a waste comprising the following steps. First the waste material is pyrolyzed to form a char material. The char material is then agitated in order to selectively de-agglomerate the agglomerated particles in the char into finite component parts of the char. The de-agglomerated component particles are then separated from the unitary particles which remain unaffected by the agitation process.

It is an object of the present invention to reduce the amount of energy previously required in the reclaiming of carbon black from scrap material by the selective de-agglomeration of agglomerated particles and allowing the remaining gritty unitary particles to remain intact for separation out of the final product.

Therefore, it is an object of the present invention to provide a particulate matter from previously unusable char forms, by a method which uses substantially less energy than prior art methods.

It is a further object of the present invention to provide a method for reclaiming carbon black from scrapped rubber materials which is directly usable in its reclaimed form and is commercially practicable.

It is a further object of the present invention to selectively de-agglomerate agglomerated or cluster particles by means of a physical agitation and without the expensive and energy consuming process of grinding or milling of the entire char material.

Additional objectives, advantages and features of the present invention will become apparent from the following description in the appended claims taken in conjunction with the accompanying drawings.

DESCRIPTION OF THE PREFERRED EMBODIMENT

According to the present invention there is provided a method for reclaiming carbonaceous material from a waste material including the steps of first pyrolyzing the waste material to form a char material. The resultant char material comprises a mixture of agglomerated particles which are clusters or agglomerates of smaller particles and gritty unitary particles which are not easily broken down and are unwanted in the final product. Second, the agglomerated particles in this char material are then selectively de-agglomerated into fine particulate matter leaving the unitary particles unaffected. Third, the resultant de-agglomerated product is separated from the unitary particulate product.

Preferably the present process may be used to remove carbon black from scrap rubber such as tires and the like. However, other materials could be recovered and/or other materials used to recover carbon black using the process of the present invention.

The carbon material such as scrap tires in the present case is first pyrolyzed by conventional processes as are known to those skilled in the art. A pyrolysis process is generally a decomposition of the material by imposing large amounts of heat on the material in an oxygen free atmosphere and thus releasing the organic materials which were used to originally produce the rubber material in the first place which then can be recovered and reused. The resulting product used in the present invention is in the form of a char material which contains steel and other impurities which were contained in the tire rubber prior to the pyrolysis. These char materials are approximately one to one thousand microns in size and constitute agglomerates of smaller particles, most of which are carbon black, along with the gritty unitary particles. The carbon black is the desirable material which may be reclaimed and reused by the process of the present invention. The unitary particles are gritty or sand like particles which are unaffected by the agitation used in the present invention. While the agglomerated particles may be easily broken down into the component particles, the unitary particles would require actual grinding or milling in order to reduce the particle size. Therefore, the present invention requires only enough energy to de-agglomerate the agglomerates without attempting to reduce the particle size of these unitary particles, thus creating a substantial energy savings over the prior art methods which concentrated on reduction of particle size of the entire material, by the use of fluid mills or grinding.

Figure 5:
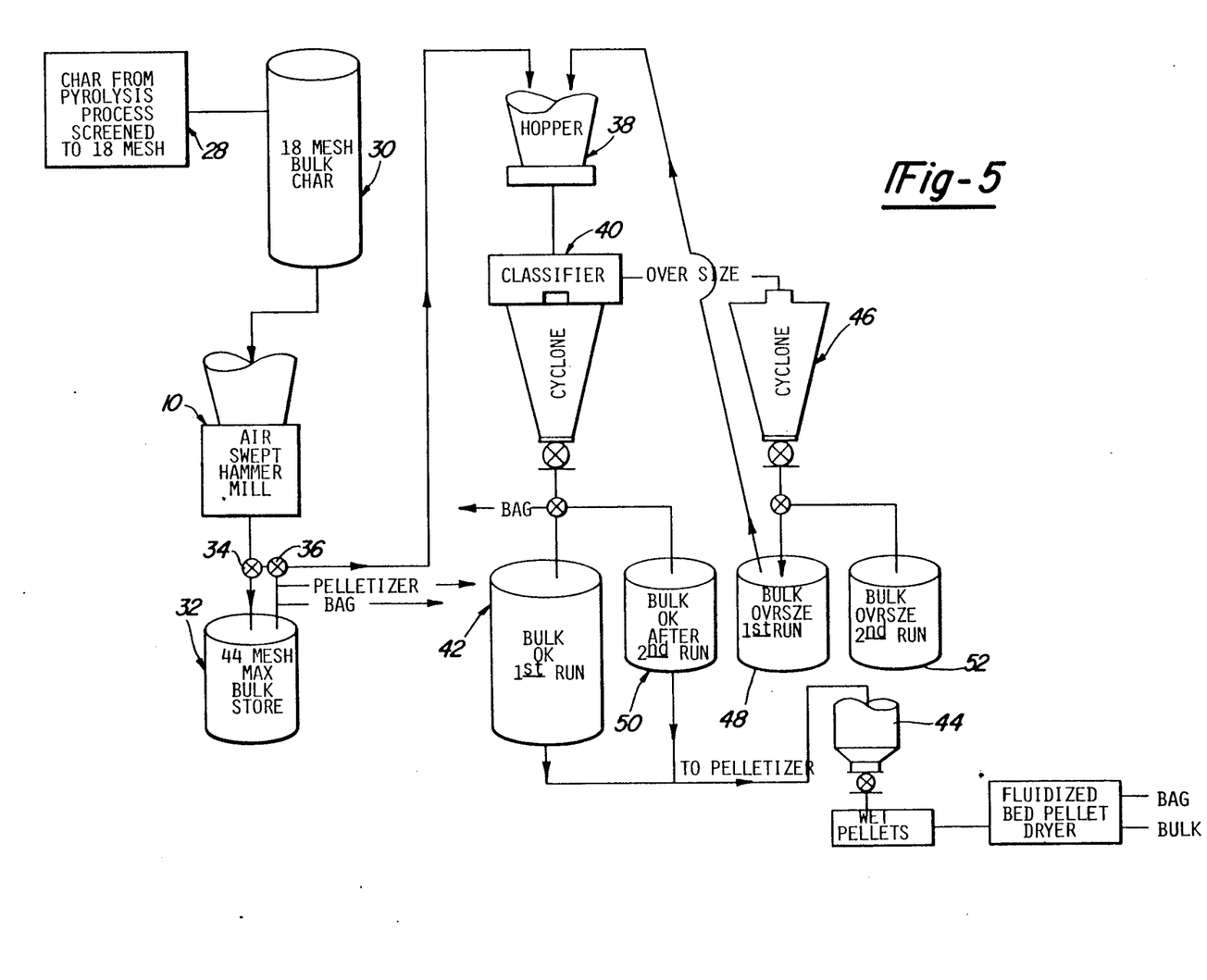
FIG. 5 is a flow chart drawing showing the method of the present invention.

It is preferable that at this point the char material is separated from the impurities by such means as magnetic screens or by other separation methods as are known to those skilled in the art. As shown in FIG. 5 an 18 mesh screen is used to filter the char material produced by the pyrolysis process.

The agglomerated particles in the char material are selectively de-agglomerated in a second step. This is accomplished by use of an apparatus that would agitate the particles and cause them to mechanically free themselves from their agglomerated state.

Figures 3, 4:
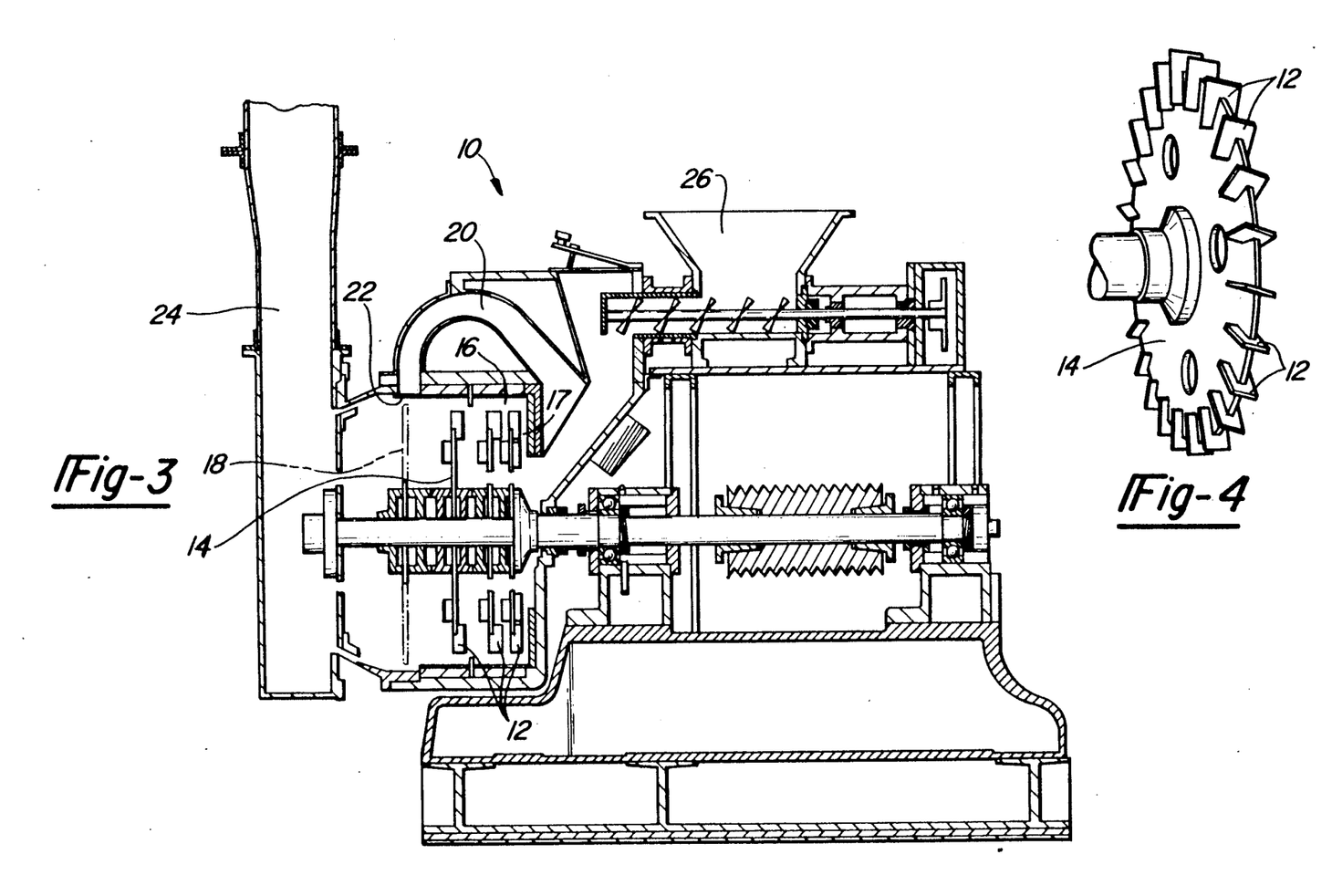
FIG. 3 is a cross-sectional view of the modified air swept hammer mill as used in the de-agglomerization process of the present invention.
FIG. 4 is a perspective view (partially broken away) showing a beater blade as used in the modified air swept hammer mill of the present invention.

The apparatus used in the de-agglomeration process of the present invention is shown in FIG. 3. This apparatus is a modified air swept hammer mill 10 which is conventionally used to grind and classify particulate matter. In the present application, however, the mill is not used in its grinding capabilities but is readjusted and modified to provide for only agitation which will liberate the carbon black particulate matter from the larger agglomerated particles and which will not act to grind or reduce the particle size of the unitary particles contained in the char. As shown in FIG. 3 the beater blade 14 having perimeter beaters 12 which are usually used to grind particulate matter are readjusted for the maximum clearance at points 16, 17 and therefore provide little or no energy consuming grinding action. A representative beater blade 14 is shown in FIG. 4a for purposes of illustration. The reclassifier blade (18 shown in phantom in FIG. 3) is removed to provide maximum agitation of the char material and the tailings recycling housing 20 is closed off by door 22. Thus, by use of such a modified instrument the char material is introduced in the feeder 26 which introduces the material to the agitation mechanism. The agitation mechanism thereby physically agitates the char material to break down and physically separate the particulate carbon black material from its agglomerated condition. In operation the char material is inputted at the feeder 26 and agitated by the beaters 12. During the agitation the particulate matter is further swept through the discharge housing 24 and then collected at a collection or filter apparatus (not shown). The resultant material is then air classified for producing an extremely fine grade of carbon black material which is suitable for use as a commercial grade carbon black material and for separating the unaffected unitary particles.

Figure 1:
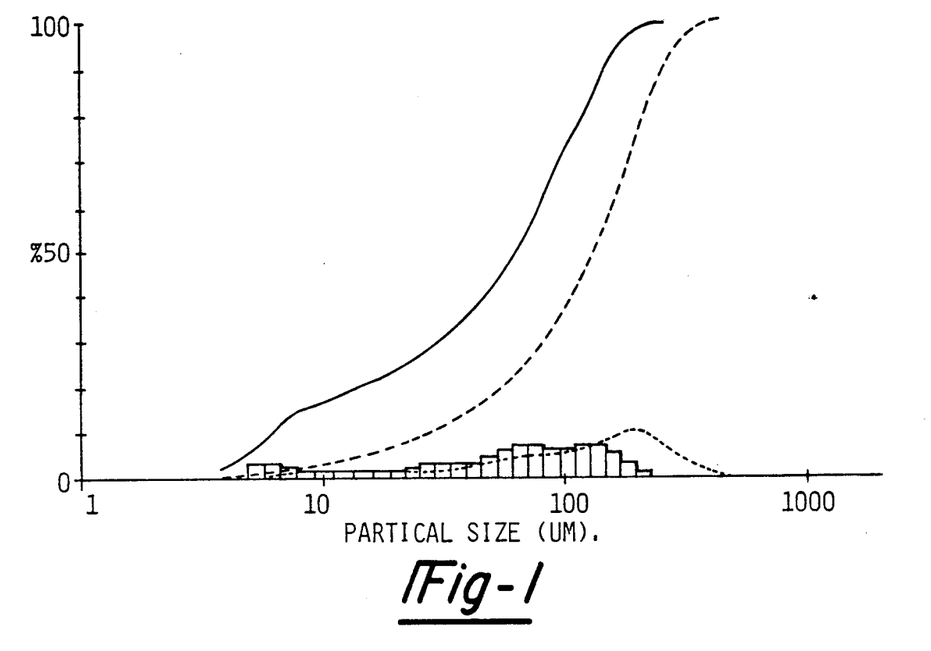
FIG. 1 is a graph showing particle size of the material after the pyrolysis process as opposed to the particle size after the de-agglomeration process of the present invention.

FIG. 1 illustrates the particle size distribution between the screened char material after the pyrolysis and screening to 18 mesh (shown by dashed lines in the figure) and that of the material after the de-agglomeration process of the present invention. These samples were taken from representative runs of the present invention and analyzed using laser diffraction techniques. As is shown in FIG. 1 the particle size distribution has been reduced dramatically from particle sizes ranging up to 1,000 microns prior to de-agglomeration to a distribution wherein 90% of the particles after de-agglomeration were less than 150 microns in size. The bar graphs shown at the base of FIG. 1 show the distribution of particles size in the materials which also demonstrates a greater distribution of smaller particle after the de-agglomeration process of the present invention.

An air classifier apparatus is used at this point to separate the fine carbon black particles from the larger unitary particles which were substantially unaffected by the de-agglomeration process to form the final carbon black product which may then be collected. Thus, the final product is a commercially practicable carbon black product which may then be collected.

Figure 2:
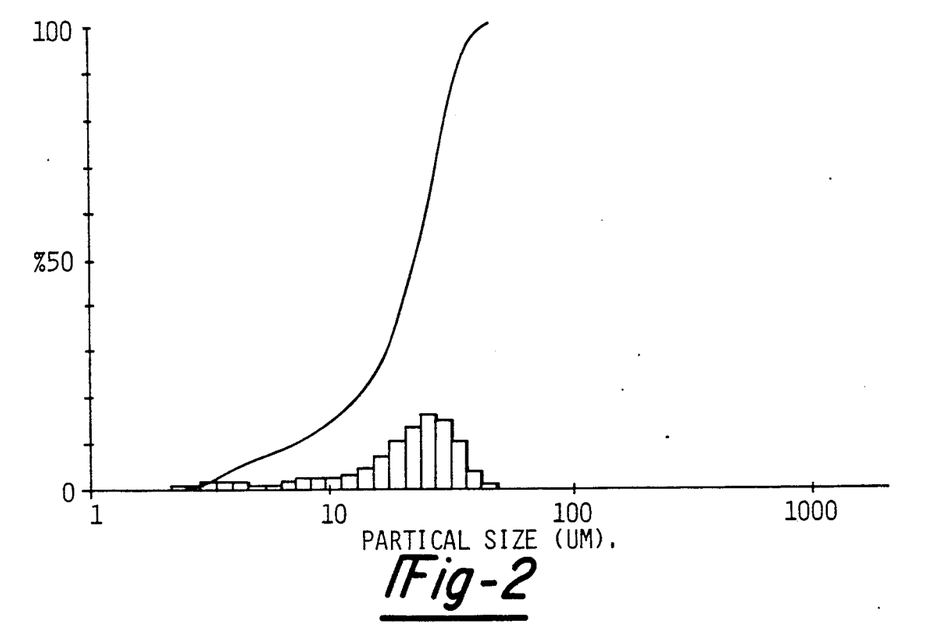
FIG. 2 is a graph showing the range of particle size after classification of the present invention.

Shown in FIG. 2 is a particle size distribution analysis of the product collected after the air classification step of the present invention showing a further reduction in final particle size from the de-agglomeration step. Analyzing this data reveals that the resultant product contains 90% of particle sizes less than 33.1 microns with a mean particle size of 22.2 microns.

Thus, through the air classification step the desired carbon black material which was selectively de-agglomerated in the prior step is separated from the unwanted unitary particles which were unaffected by the selective de-agglomeration process.

Therefore, in the present invention the inventor has deviated from the teachings in the prior art process, to pulverize the char to obtain fine carbon black particles, to the present process wherein the char is physically agitated to release the fine particles from the agglomerate char particles, and leave the unitary particles unaffected.

Thus, in the present invention the modified air swept mill operates as a large series of impeller blades which cause physical agitation of the agglomerate particles. It is believed that this agitation will cause the agglomerated particles in the char material, which are agglomerates or clusters of smaller individual particles to break apart into the smaller individual particles which comprise them. Thus, while the air swept mill apparatus with the modifications as disclosed above, is disclosed as one mechanism of de-agglomerating these particles, other machines could advantageously be used which provides an agitation of the material which will cause the individual particles contained in the char to break away from the agglomerate particles such as by the agitation disclosed above.

Referring now to FIG. 5 a flow chart is provided showing the entire process sequence of the present invention. As shown therein, the char 28 from the pyrolysis of scrap rubber, screened to 18 mesh, is transferred to container 30 and shipped to the reclaiming apparatus. The bulk char material is then input into the air swept hammer mill 10 and is selectively de-agglomerated as disclosed above. The resultant material may be either stored in container 32 through valve 34 and pelletized or bagged for use as a low grade carbon black or can be routed through valves 34, 36 to the air classifier for further refinement. Generally, the de-agglomerated char is then routed to hopper 38 and into the air classifier 40. Air classifier 40 then classifies the material and removes material in particle sizes from about 1 to about 100 microns. This material is then collected through the cyclone unit 41 in container 42 which is pelletized in pelletizer 44 which pellets are then dried and bagged or packaged in bulk or this material is directly bagged as the final product.

The oversize material from the air classifier 40 is then routed to a second cyclone 46 into container 48. This oversized material is then routed to the air classifier 40 to remove any remaining usable carbon black material which was not removed during the first run. The recovered product from the second run is then routed to container 50 and is processed as final product into pellet or bagged form. The oversized material from this run is then routed through cyclone 46 and into container 52 which material consists of essentially the unwanted unitary particles contained in the char material. This is then discarded as waste.

EXAMPLES

The invention will be more fully understood by reference to the following examples which are to be considered as merely illustrative thereof.

EXAMPLE I

Scrap tires are pyrolyzed using a destructive distillation type process. The resultant char material designated as NU-TECH char material is obtained in drums.

An air swept pulverizer is modified by removing the reclassifier plate, and adjusting the machine clearances for minimum grinding to keep any possible grinding or pulverizing action to a minimum. In the present case a ⅛" tip clearance (16) was used and a ⅛" back clearance 17 was used.

The char material is then placed in the modified air swept pulverizer 10. The machine is allowed to operate at maximum revolutions per minute with the char material being fed in as fast as possible. The char particles are agitated in the mechanism for de-agglomeration of the char particles into individual particles. The resultant product is a carbon black and is air swept out of the unit and removed at a product filter collector (not shown). This product is then air classified to remove impurities and larger unitary particles to obtain a representative sample for final use.

For purposes of the present example the following parameters were used. A Schwartz-O'Neil Model 16, Air Swept Pulverizer was used for the present example with the following parameters. The air swept mill is adjusted to approximately a ⅛" tip clearance and a ⅛" back clearance. The machine was run at 4690 RPM using 20 HP engine with an air velocity of 545 cubic feet per minute and the char material was inputted at a rate of 1,000 lbs./hr.

Several runs using the air classifier were accomplished and the resultant products were designated ATR077, Pyroblack 5F, Pyroblack 7F, Pyroblack 5AF and Pyroblack 3S. A Micro-Sizer MS-20 Air Classifier system was used which is produced by Amvest Progressive Industries, Inc. The parameters for these runs are listed in Table I.

TABLE I

| Air Classifier Parameters | | | | | |
|---|---|---|---|---|---|
| | ATR077 | 5F | 7F** | 5AF | 3S* |
| Fan Speed (RPM) | 4600 | 4600 | 4000 | 4600 | — |
| Run Time (min:sec.) | 8:00 | 8:00 | 9:00 | 48:25 | — |
| Feed Rate (lb./hr) | 712 | 712 | 807 | 478 | — |
| Rotor Speed (RPM) | 2600 | 2600 | 1600 | 2600 | — |
| Total Feed Weight (lb.) | 95 | 95 | 121 | 386 | — |

*3S is raw product from modified air swept mill (not air classified).
**Left over course product from the 5F run is used for further classification here.

The ATR077 sample was found to have reinforcement properties similar to an N-770 series commercially produced carbon black. The particle size of ATR077 was analyzed using Malvern laser beam diffraction equipment. This indicated a 5–100 micron range particle size with an average particle size of 40–50 microns. The reinforcement of the ATR077 of the present invention was found to be equivalent to commercial carbon blacks with particles sizes of 0.05 to 0.1 microns. It is believed that the ATR077 carbon black of the present invention would be suitable for use as a semi-reinforcing filler in tires, hoses, belts, molded goods and extruded goods. ATR077 was pelletized and analyzed. The analysis of the properties of this material are summarized in Table II.

TABLE II

| Typical Properties of ATR077 | |
|---|---|
| Form | Black Pellet |
| Specific Gravity | 1.83 |
| Bulk Density | 31 lb./ft$^3$ |
| ph | 7.8 |
| Ash | 13% |
| Volatiles | 0.25% |
| Carbon Content | 81.0% |
| Total Sulfur (non-reactive) | 2.8% |
| Particle Size, measured | 40–50 micron |
| Particle Size, effective | 0.05–0.1 micron |

EXAMPLE II

A natural rubber compound using the ATR077 carbon black from Example 1 is prepared using the recipe prescribed in ASTMD3192 for testing of the carbon black of the present invention. Two control compounds were also prepared using MT N-990 carbon black and IRB #6 carbon black. The resulting compounds are tested, the test results are summarized in Table III.

TABLE III

| | Natural Rubber | | |
|---|---|---|---|
| Loading | ATR077 50 phr | N-990 50 phr | IRB #6 50 phr |
| Rheometer @ 293° F. | | | |
| Max. Torque Lbf. in. | 74.8 | 69.5 | 88.7 |
| Min. Torque Lbf. in. | 21.1 | 15.4 | 24.1 |
| Cure Time 90%, min. | 25.0 | 25.75 | 29.75 |
| Scorch Time ts2, min. | 10.0 | 9.50 | 10.25 |
| Physical Properties 15'/293° F. | | | |
| Tensile, psi | 3600 | 3480 | 3990 |

TABLE III-continued

| | Natural Rubber | | |
|---|---|---|---|
| Loading | ATR077 50 phr | N-990 50 phr | IRB #6 50 phr |
| 300% Modulus, psi | 1320 | 730 | 1870 |
| Elongation % | 560 | 660 | 550 |
| Hardness | 57 | 50 | 65 |
| 30'/293° F. | | | |
| Tensile, psi | 3330 | 3250 | 3950 |
| 300% Modulus, psi | 1560 | 950 | 2170 |
| Elongation % | 510 | 610 | 510 |
| Hardness | 60 | 52 | 69 |

The results indicate that a natural rubber material using the ATR077 carbon black of the present invention results in a natural rubber compound which is superior to the compound using a commercial grade MT N-990 carbon black and has similar properties to a compound using a N-770 grade carbon black. Thus, the use of the ATR077 compound in a natural rubber provides characteristics denoting that such a carbon black is between the N-990 grade and the IRB#6 grade when used in a natural rubber compound.

EXAMPLE III

A synthetic butyl rubber compound containing the ATR077 product was prepared and a second SBR control compound using the N-990 carbon black was prepared using a recipe containing the following consistencies: SBR 1502-100; ZnO-3.0; Stearic Acid 1.0; Sulfur 1.75; Santocure NS-1.0; ATR077 or N-990 carbon black 50.0. These compounds were tested and the results are tabulated in Table IV.

TABLE IV

| Loading | ATR077 50 phr | N-990 50 phr |
|---|---|---|
| Rheometer @ 320° F. | | |
| Max. Torque Lbf. in. | 85.9 | 74.0 |
| Min. Torque Lbf. in. | 14.8 | 9.8 |
| Cure Time 90% Min. | 17.8 | 19.3 |
| Scorch Time, ts2 Min. | 6.4 | 8.5 |
| Physical Properties | | |
| Tensile, psi | 2250 | 1420 |
| 300% Modulus, psi | 1560 | 660 |
| Elongation % | 440 | 580 |
| Hardness | 64 | 55 |
| Tear, C, ppi | 201 | 151 |
| Comp. Set, Mth B | 19.0 | 19.3 |

Thus, the ATR077 product appears to be equal to or superior to the N-990 carbon black when used in a synthetic butyl rubber formulation.

EXAMPLE IV

Natural rubber formulations were prepared using the remaining pryoblack formulations prepared in Example 1 and using the MT N-990 carbon black material in a control formulation. These formulations were prepared with the constituents as shown in Table V.

TABLE V

| | Natural Rubber Formulations | | | | |
|---|---|---|---|---|---|
| | MT N-990 CONTROL | PYROBLACKS | | | |
| | | 5F | 7F | 5AF | 3S |
| RSS #1 Natural Rubber | 100.0 | 100.0 | 100.0 | 100.0 | 100.0 |
| Zinc Oxide | 5.0 | 5.0 | 5.0 | 5.0 | 5.0 |
| Stearic Acid | 2.0 | 2.0 | 2.0 | 2.0 | 2.0 |
| Sulfur | 2.25 | 2.25 | 2.25 | 2.25 | — |
| Santocure NS | 1.2 | 1.2 | 1.2 | 1.2 | 1.2 |
| MT N-990 | 50.0 | — | — | — | — |
| Pyroblack 5 | — | 50.0 | — | — | — |
| Pyroblack 7F | — | — | 50.0 | — | — |
| Pyroblack 5AF | — | — | — | 50.0 | — |
| Pyroblack 3S | — | — | — | — | 50.0 |
| TOTALS | 160.45 | 160.45 | 160.45 | 160.45 | |

These compounds were then tested using the methods summarized in Table VI.

TABLE VI

| TEST METHODS | |
|---|---|
| Rheometer | ASTM D 2084 |
| | 290 F., 30 min. clock, 100 cpm, |
| | 3 arc, 100 range |
| Elongation, Tensile Strength Modulus | ASTM D 412 |
| | Die C dumbbells tested at |
| | 20 in/min |
| Durometer | ASTM D 2240 |
| | Instantaneous Shore A |
| Tear Resistance | ASTM D 624, Die C |
| Specific Gravity | ASTM D 297 |
| | Hydrostatic Method |
| Bashore Rebound | ASTM D 2632 |
| | Tested at 75 F. |
| Compression Set | ASTM D 395, Method B |
| | 22 hrs. at 158 F., 25% deflection, |
| | ½ hr. recovery |
| Dispersion Rating | Microscopic examination at 30 X, |
| | (0–10 rating, 10 = best) |

The results of these tests are summarized in Table VII.

TABLE VII

| | MT N-990 CONTROL | PYROBLACKS | | | |
|---|---|---|---|---|---|
| | | 5F | 7F | 5AF | 3S |
| RHEOMETER DATA | | | | | |
| Minimum Torque, lbf. in. | 13.0 | 16.6 | 19.4 | 16.7 | 16.8 |
| Maximum Torque, lbf. in. | 84.2 | 96.3 | 96.4 | 94.2 | 95.1 |
| Optimum Cure Time | 18.4 | 16.5 | 15.8 | 17.3 | 16.8 |
| Scorch Time, TS2, min. | 10.4 | 7.1 | 8.4 | 7.5 | 8.3 |
| ORIGINAL PHYSICAL PROPERTIES | | | | | |
| Ultimate Elongation, % | 530 | 420 | 340 | 420 | 370 |
| 100% Modulus, psi | 320 | 610 | 560 | 610 | 610 |
| 200% Modulus, psi | 740 | 1360 | 1050 | 1330 | 1180 |
| 300% Modulus, psi | 1390 | 2220 | 1480 | 2230 | 1810 |
| 400% Modulus, psi | 3360 | 3440 | — | 3170 | — |
| Tensile Strength, psi | 3360 | 3440 | 1690 | 3390 | 2310 |
| Shore A Durometer, pts. | 60 | 67 | 67 | 68 | 68 |
| TEAR RESISTANCE | | | | | |
| Tear Strength, ppi | 246 | 269 | 188 | 263 | 234 |
| SPECIFIC GRAVITY | | | | | |

TABLE VII-continued

|  | MT N-990 CONTROL | PYROBLACKS | | | |
|---|---|---|---|---|---|
|  |  | 5F | 7F | 5AF | 3S |
| Specific Gravity | 1.13 | 1.14 | 1.15 | 1.14 | 1.14 |
| BASHORE REBOUND | | | | | |
| Resilience, % | 66.0 | 61.0 | 65.5 | 59.0 | 63.0 |
| COMPRESSION SET | | | | | |
| Compression Set, % | 23.1 | 22.7 | 16.7 | 22.5 | 22.2 |
| DISPERSION RATING | | | | | |
| Rating | 10 | 10 | 10 | 10 | 10 |

From these results it is summarized that the pyroblack 5F and 5AF is approximately better than the equivalent compound using the MT N-990 carbon black and is approximately equal to an N-770 grade carbon black. Therefore, it is believed that these compounds would be suitable for use in compounds which have formerly used the N-990 commercial grade of carbon black. Additionally, it appears from these tests that the Pyroblack 7F would be equivalent to N-990 for use in the natural rubber compounds.

EXAMPLE IV

Representative synthetic butyl rubber formulations were prepared as shown in Table VIII.

TABLE VIII

| SBR FORMULATIONS | | | | | |
|---|---|---|---|---|---|
|  | MT N-990 CONTROL | PYROBLACKS | | | |
|  |  | 5F | 7F | 5AF | 3S |
| SBR 1502 Rubber | 100.0 | 100.0 | 100.0 | 100.0 | 100.0 |
| Zinc Oxide | 3.0 | 3.0 | 3.0 | 3.0 | 3.0 |
| Stearic Acid | 1.0 | 1.0 | 1.0 | 1.0 | 1.0 |
| Sulfur | 1.75 | 1.75 | 1.75 | 1.75 | 1.75 |
| Santocure NS | 1.0 | 1.0 | 1.0 | 1.0 | 1.0 |
| MT N-990 | 50.0 | — | — | — | — |
| Pyroblack 5F | — | 50.0 | — | — | — |
| Pyroblack 7F | — | — | 50.0 | — | — |
| Pyroblack 5AF | — | — | — | 50.0 | — |
| Pyroblack 3S | — | — | — | — | 50.0 |

The compounds were tested using the procedures and methods of Table V. The test results are summarized in Table IX.

TABLE IX

|  | MT N-990 CONTROL | PYROBLACKS | | | |
|---|---|---|---|---|---|
|  |  | 5F | 7F | 5AF | 3S |
| SBR FORMULATIONS | | | | | |
| Minimum Torque, lbf. in | 9.8 | 15.1 | 18.2 | 14.8 | 16.1 |
| Maximum Torque, lbf. in | 74.0 | 88.2 | 92.4 | 85.9 |  |
| Optimum Cure Time, Tc 90% | 19.3 | 17.9 | 19.5 | 17.8 | 18.9 |
| Scorch Time, TS2; min. | 8.5 | 6.5 | 6.8 | 6.4 | 6.3 |
| ORIGINAL PHYSICAL PROPERTIES | | | | | |
| Ultimate Elongation, % | 580 | 470 | 330 | 440 | 400 |
| 100% Modulus, psi | 200 | 350 | 450 | 430 | 370 |
| 200% Modulus, psi | 390 | 830 | 810 | 960 | 800 |
| 300% Modulus, psi | 660 | 1410 | 1040 | 1560 | 1160 |
| 400% Modulus, psi | 920 | 1970 | — | 2150 | 1550 |
| Tensile Strength, psi | 1420 | 2430 | 1100 | 2250 | 1550 |
| Shore A Durometer, pts. | 55 | 63 | 65 | 64 | 63 |
| TEAR RESISTANCE | | | | | |
| Tear Strength, ppi | 151 | 188 | 169 | 201 | 184 |
| SPECIFIC GRAVITY | | | | | |
| Specific Gravity | 1.15 | 1.15 | 1.15 | 1.16 | 1.15 |
| BASHORE REBOUND | | | | | |
| Resilience, % | 52.0 | 48.5 | 50.0 | 48.5 | 50.0 |
| COMPRESSION SET | | | | | |
| Compression Set, % | 19.3 | 18.7 | 17.0 | 19.0 | 18.5 |
| DISPERSION RATING | | | | | |
| Rating | 10 | 10 | 10 | 10 | 10 |

Thus, it can be surmised from the above data that the pyroblack samples of the present invention can be readily used in natural and SBR compounds in the place of commercial carbon blacks.

Because of his discovery that these char particles are actually agglomerates of smaller carbon black particles and other unwanted unitary particles, the inventor is able to obtain a purified carbon black product from char by agitation of these char particles which physically separates the finer particles from the agglomerate particles without reducing the particle size of the unitary particles. This process requires substantially less energy than milling or grinding char particles to a smaller size. Thus, in the present invention it is believed that the agglomerated particles are selectively de-agglomerated by the agitation provided by the mill, by contacting moving parts of the mill and impact between the particles themselves rather than grinding of the particles between two grinding surfaces under pressure or by the fluid milling as was taught in the prior art. Therefore, in the present process a superior grade carbon black material can be reclaimed from rubber or elastomer compounds at a price which is competitive and profitable when compared with carbon blacks produced by conventional processes.

While the present invention has been disclosed as a method for reclaiming carbon black it will be recognized by those skilled in the art that the method and discovery of the present invention will be useful in reclaiming other useable materials from a waste material other than as disclosed above. Therefore the present invention should be limited only as by the scope of the appended claims.

The present invention has been described in an illustrative manner, using words of description rather than that of limitation. Many modifications and variations of the present invention are possible in light of the above teachings. It is therefore to be understood, that within the scope of the appended claims the invention may be practiced otherwise than as specifically described without deviating from the scope of the present invention.

What is claimed is:

1. A method for reclaiming carbonaceous materials from waste comprising the steps of:
   a. pyrolyzing a waste material to form a char material, said char material containing agglomerated particles and unitary particles;
   b. agitating said char material to selectively de-agglomerate said agglomerated particles in said char material into de-agglomerated component particles wherein said agitation will not act to grind the unitary particles contained in the char;
   c. separating the resultant de-agglomerated component particles from said unitary particles in the product of step b.

2. The method according to claim 1 wherein said agitation of said char particles is accomplished by using an impeller means for agitation of the material.

3. The method according to claim 2 wherein said impeller means further comprises an air swept mill.

4. The method according to claim 1 wherein said agitating is accomplished by way of an impeller in an enclosed housing, said impeller being rotatable in said housing, said housing being for said char material being placed in said housing and said impeller causing said agitation for de-agglomeration of said agglomerated particles in said char material into individual particles.

5. The method according to claim 1 wherein said separation step is accomplished by an air classifier mechanism.

6. A method for reclaiming carbon black from a scrap rubber comprising the steps of:
   a. pyrolyzing said scrap rubber for forming a char material, said char material comprising agglomerated particles containing an agglomeration of carbon black particles and unitary particles;
   b. selectively de-agglomerating said agglomerated particles in said char material into component carbon black particles without grinding of the unitary particles such as to leave the unitary particles unaffected; and
   c. separating said component carbon black particles from said unitary particles.

7. The method according to claim 6 wherein said de-agglomerating of said char material is accomplished by physical agitation of said char material for breaking off individual carbon black particles from said agglomerated particles.

8. The method according to claim 7 wherein said physical agitation is accomplished by using a rotating impeller means.

9. The method according to claim 7 wherein said physical agitation is accomplished by an air swept mill.

10. The method according to claim 7 wherein said agglomerated particles of said char materials are selectively de-agglomerated by placing said char material into a container having a plurality of rotatable impeller blades, said impeller blades being for physically agitating said char material to provide said de-agglomeration.

11. A method for reclaiming carbon black from a char material obtained from pyrolyzing rubber, said char material including agglomerated particles of finer carbon black particles and unitary particles said method comprising the steps of:
   a. selectively de-agglomerating said agglomerated particles in said char material by physically agitating said char material for breaking down said agglomerated particles into component carbon black particles without grinding of the unitary particles;
   b. separating said carbon black particles from said unitary particles in said char material.

12. The method according to claim 11 wherein said selective de-agglomeration of said agglomerated particles is accomplished by an impeller means for agitation of said char material.

13. The method according to claim 12 wherein said impeller means further comprises an air swept hammer mill.

14. The method according the claim 11 wherein said carbon black particles are separated from said unitary particles by an air classifier.

15. The method according to claim 11 wherein said carbon black particles in the range of about less than 100 microns are separated and collected from said material.

16. A method for isolating carbon black material from a pyrolyzed char said char material including agglomerated particles comprising agglomerations of individual carbon black particles and unitary particles, said method comprising the steps of:
   a. separating metal and impurities by screen separation from the char material;
   b. placing said char material into an agitation means for providing selective de-agglomeration of individual carbon black particles from said agglomerations by physical agitation of said char material without grinding or reduction in particle size of said unitary particles;
   c. collecting said de-agglomerated product; and
   d. air classifying said product to separate carbon black particles from said unitary particles to obtain carbon black particles ranging in size from about 1 micron to about one hundred microns and a bulk oversize material.

17. The method according to claim 16 wherein said agitation means further comprises an impeller for agitation of said char material.

18. The method according to claim 16 wherein said agitation means further comprises an air swept hammer mill.

19. The method according to claim 16 further comprising the steps of:
   e. collecting said carbon black particles and said bulk oversize material in separate containers;
   f. repeating said air classifying step on said bulk oversized material.

* * * * *